(12) United States Patent
Zhou et al.

(10) Patent No.: US 11,362,513 B2
(45) Date of Patent: Jun. 14, 2022

(54) HYBRID OVERVOLTAGE PROTECTION DEVICE AND ASSEMBLY

(71) Applicant: Littelfuse Semiconductor (Wuxi) Co., Ltd., Wuxi (CN)

(72) Inventors: Jifeng Zhou, Wuxi (CN); Weihua Tian, Wuxi (CN); Teddy To, Wuxi (CN); Chuan Fang Chin, Wuxi (CN)

(73) Assignee: Littelfuse Semiconductor (Wuxi) Co., Ltd., Wuxi (CN)

( * ) Notice: Subject to any disclaimer, the term of this patent is extended or adjusted under 35 U.S.C. 154(b) by 0 days.

(21) Appl. No.: 16/491,369

(22) PCT Filed: Mar. 7, 2017

(86) PCT No.: PCT/CN2017/075867
§ 371 (c)(1),
(2) Date: Sep. 5, 2019

(87) PCT Pub. No.: WO2018/161248
PCT Pub. Date: Sep. 13, 2018

(65) Prior Publication Data
US 2020/0028354 A1    Jan. 23, 2020

(51) Int. Cl.
*H02H 9/00* (2006.01)
*H02H 9/04* (2006.01)
(52) U.S. Cl.
CPC ............ *H02H 9/042* (2013.01); *H02H 9/005* (2013.01)
(58) Field of Classification Search
CPC ......... H02H 9/042; H02H 9/005; H02H 9/041
See application file for complete search history.

(56) References Cited

U.S. PATENT DOCUMENTS

| 4,695,916 A | 9/1987 | Satoh et al. |
| 5,003,588 A | 3/1991 | Wingerath |
| 6,226,166 B1 | 5/2001 | Gumley et al. |

(Continued)

FOREIGN PATENT DOCUMENTS

| CN | 101552465 A | 10/2009 |
| CN | 103718408 A | 4/2014 |

(Continued)

OTHER PUBLICATIONS

Extended European Search Report dated Oct. 21, 2020 for European Patent Application No. 17900051.8.

(Continued)

*Primary Examiner* — Adolf D Berhane
*Assistant Examiner* — Afework S Demisse
(74) *Attorney, Agent, or Firm* — KDB Firm PLLC

(57) ABSTRACT

In one embodiment, an overvoltage protection device (100) may include a crowbar device (106), where the crowbar device (106) includes a first crowbar terminal (115), the first crowbar terminal (115) connected with a first external voltage line (102). The overvoltage protection device (100) may further include a transient voltage suppression (TVS) device (108), where the TVS device (108) includes a second TVS terminal (121), the second TVS terminal (121) connected with a second external voltage line (104). The crowbar device (106) and the TVS device (108) may be arranged in electrical series between the first crowbar terminal (115) and the second TVS terminal (121).

8 Claims, 5 Drawing Sheets

(56) References Cited

U.S. PATENT DOCUMENTS

| | | | |
|---|---|---|---|
| 6,583,496 B2 * | 6/2003 | Galtie | H01L 21/761 |
| | | | 257/107 |
| 8,093,133 B2 | 1/2012 | Saucedo-Flores et al. | |
| 8,599,522 B2 | 12/2013 | Aronov et al. | |
| 9,997,507 B2 * | 6/2018 | Kashyap | H01L 27/0248 |
| 2008/0192394 A1 * | 8/2008 | Harris | H02H 9/025 |
| | | | 361/56 |
| 2014/0167101 A1 * | 6/2014 | Bobde | H01L 29/87 |
| | | | 257/112 |
| 2018/0240575 A1 * | 8/2018 | To | H01C 7/12 |

FOREIGN PATENT DOCUMENTS

| | | |
|---|---|---|
| EP | 0186873 A2 | 7/1986 |
| EP | 0360933 A1 | 4/1990 |
| JP | 52-34354 | 3/1977 |
| JP | 3125991 B2 | 11/2000 |
| WO | 2017024577 A1 | 2/2017 |

OTHER PUBLICATIONS

International Search Report from PCT/CN2017/075867, dated Dec. 11, 2017, 4 pages.
Written Opinion from PCT/CN2017/075867, dated Dec. 11, 2017, 4 pages.

* cited by examiner

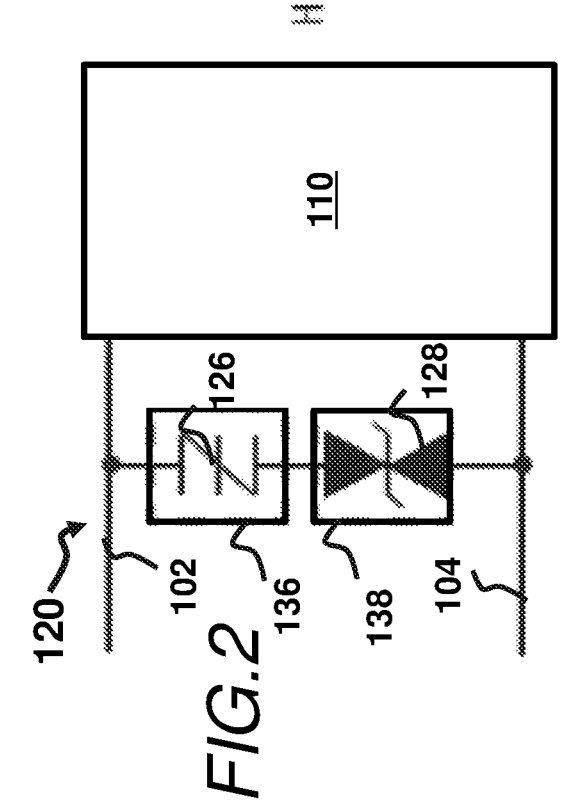
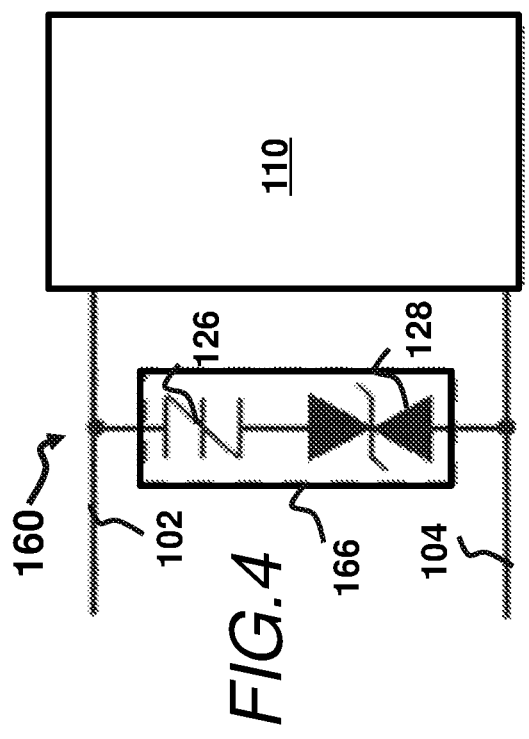
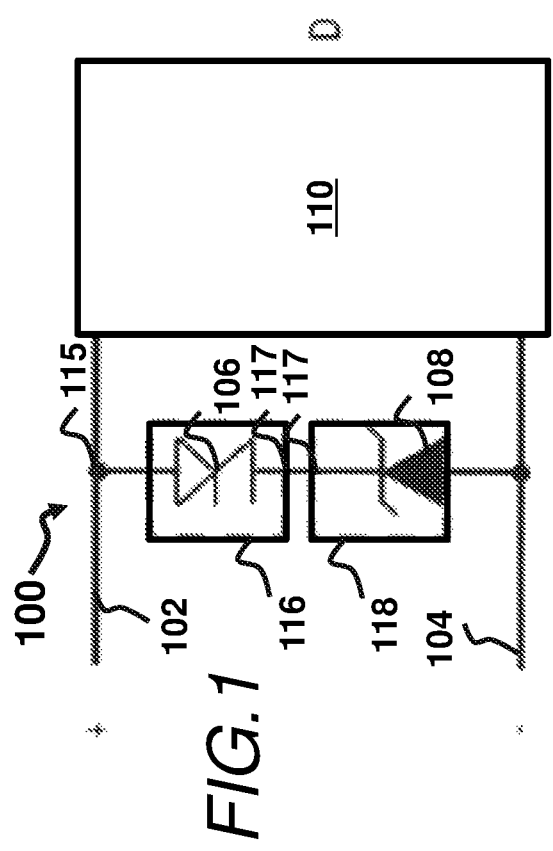
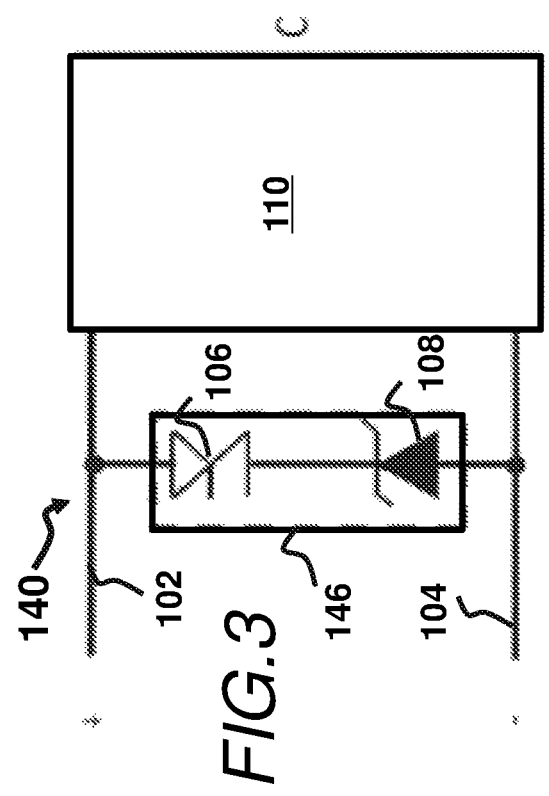

HYBRID OVERVOLTAGE PROTECTION DEVICE AND ASSEMBLY

BACKGROUND

Field

Embodiments relate to the field of circuit protection devices, and more particularly to semiconductor devices for protection against overvoltage events.

Discussion of Related Art

Semiconductor devices are widely used to provide protection against transient conditions, such as transient overvoltage events or surge events, by taking advantage of the properties of P/N junctions. In a transient voltage suppression (TVS) device, voltage may be clamped to a level characteristic of the particular clamping device. Examples of a TVS device are avalanche diodes. A Zener diode may also provide transient voltage protection. The principle of operation in TVS devices lies in the reverse voltage breakdown of a P/N junction in a diode, which "breakdown voltage" acts as a clamping voltage to limit voltage across the device. The breakdown voltage is characteristic of the particular device design, such as the doping characteristics of the P region and N region of the device. For applications such as circuit protection for components coupled to a DC power line, a TVS device may be designed to provide protection based upon a constant overvoltage rating, as well as a maximum voltage for a circuit or component to be protected. In some instances, the constant over voltage level that is needed may entail design of a TVS diode having a relatively high breakdown voltage so that the breakdown is close to the constant over voltage level. This increased breakdown voltage for a TVS device may lead to the inability to clamp voltage during a transient overvoltage event to below the maximum voltage allowed by a circuit, leading to damage or destruction of the circuit or component to be protected.

It is with respect to these and other issues the present disclosure is provided.

SUMMARY

In one embodiment, an overvoltage protection device may include a crowbar device, where the crowbar device includes a first crowbar terminal, the first crowbar terminal for connection to a first external voltage line. The overvoltage protection device may further include transient voltage suppression (TVS) device, where the TVS device includes a second TVS terminal, the second TVS terminal for connection to a second external voltage line. The crowbar device and the TVS device may be arranged in electrical series between the first crowbar terminal and the second TVS terminal.

In another embodiment, an overvoltage protection assembly may include a first semiconductor chip, where the first semiconductor chip comprises a crowbar device. The overvoltage protection assembly may also include a second semiconductor chip, where the second semiconductor chip comprises a TVS device and is electrically connected to the first semiconductor chip. The overvoltage protection device may comprise a first external terminal forming contact with the crowbar device, where the first external terminal is for connection to a first external voltage line, and may further comprise a second external terminal forming contact with the TVS device, where the second external terminal is for connection to a second external voltage line. The crowbar device and the TVS device may be arranged in electrical series between the first external terminal and the second external terminal.

BRIEF DESCRIPTION OF THE DRAWINGS

FIG. 1 presents a circuit representation of one implementation of an overvoltage protection arrangement according to embodiments of the disclosure;

FIG. 2 presents a circuit representation of one implementation of an overvoltage protection arrangement according to other embodiments of the disclosure;

FIG. 3 presents a circuit representation of one implementation of an overvoltage protection arrangement according to further embodiments of the disclosure;

FIG. 4 presents a circuit representation of one implementation of an overvoltage protection arrangement according to other embodiments of the disclosure;

DESCRIPTION OF EMBODIMENTS

Figure 5:
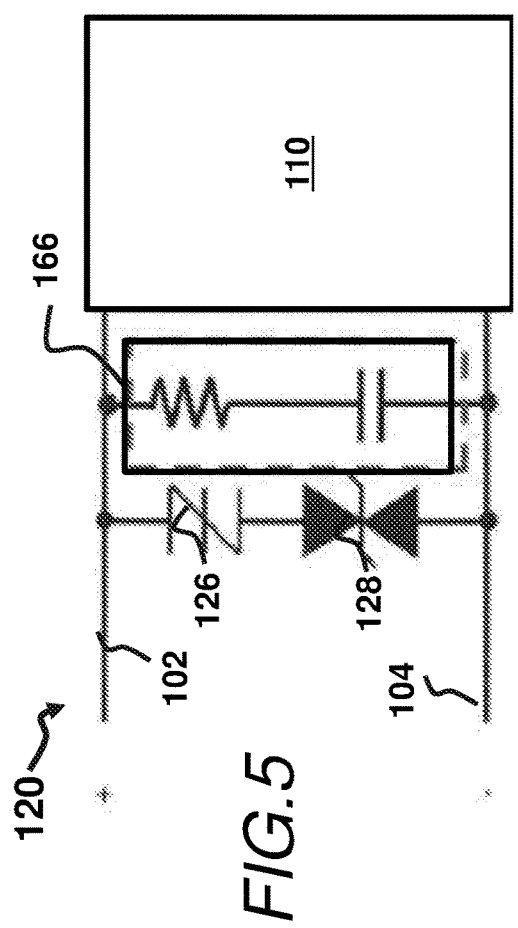
FIG. 5 presents a circuit representation of one implementation of an overvoltage protection arrangement according to further embodiments of the disclosure.

The present embodiments will now be described more fully hereinafter with reference to the accompanying drawings, in which various embodiments are shown. The embodiments may be embodied in many different forms and are not to be construed as limited to the embodiments set forth herein. These embodiments are provided so that this disclosure will be thorough and complete, and will fully convey the scope of the embodiments to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate when two or more elements are in direct physical contact with one another. The terms "on,", "overlying," "disposed on," and over, may also mean when two or more elements are not in direct contact with one another. For example, "over" may mean when one element is above another element and not in contact with another element, and may have another element or elements in between the two elements. Furthermore, the term "and/or" may mean "and", it may mean "or", it may mean "exclusive-or", may mean "one", may mean "some, not all", may mean "neither", and/or it may mean "both." The scope of claimed subject matter is not limited in this respect.

The present embodiments are generally related to overvoltage protection devices, and in particular, to hybrid devices or assemblies providing overvoltage protection. In various embodiments, a TVS device and crowbar device may be combined to form a hybrid device or hybrid assembly, in unique configurations to provide transient overvoltage protection. Examples of crowbar devices include devices that are based upon the use of silicon controlled rectifiers (SCR), thyristors, TRIACs, SIDACs, and SIDACtors® (®SIDACtor is a trademark of Littelfuse, Inc.). One advantage afforded by crowbar devices, such as silicon controlled rectifiers (SCR), SIDACs and SIDACtors, is the ability to respond rapidly to an overvoltage event and clamp the voltage to an acceptable level. In particular, when current flowing through the SIDAC and SIDACtor exceeds a switching current, the SIDAC and SIDACtor acts as a "crowbar" and simulates a short circuit condition. Unlike conventional transient voltage suppression (TVS) clamping devices such as diodes, the advantage of a crowbar type protection device is that the crowbar protection device is not damaged by overvoltage. In the present embodiments, when a transient voltage is experienced that exceeds a breakdown voltage of the hybrid device, the crowbar device portion of the hybrid device may be triggered to an ON state, while the crowbar device and TVS device act in concert to clamp the voltage to a lower voltage level.

FIG. 1 presents a circuit representation of one implementation of an overvoltage protection arrangement according to embodiments of the disclosure. In particular, an overvoltage protection assembly 100 is implemented between a first electrical line 102 and second electrical line 104. The first electrical line 102 and second electrical line 104 may be coupled to a DC C power source, thus representing DC power lines in one implementation.

In operation, the overvoltage protection assembly 100 may act to limit voltage coupled to a DC source. In the example of FIG. 1, the overvoltage protection assembly 100 may protect a circuit 110 by limiting the voltage or energy that passes through the circuit 110 during an overvoltage event. The circuit 110 may represent any electrical device, electronic device, optical device, opto-electonic device, circuit, machine, or combination of these components. The embodiments are not limited in this context.

In various embodiments, the overvoltage protection assembly 100 may act as a uni-directional device that provides response to a surge that generates an overvoltage in one direction between first electrical line 102 and second electrical line 104, appropriate for protection of circuitry coupled to a DC power source, for example.

The overvoltage protection assembly 100 may include a first discrete component 116 and a second discrete component 118, where the first discrete component 116 and second discrete component 118 are electrically connected to one another in electrical series between the first electrical line 102 and the second electrical line 104. As such, the first discrete component 116 and the second discrete component 118 may be located adjacent to one another, remote from one another, and in any convenient spatial relationship to one another.

In this embodiment, as well as other embodiments, the overvoltage protection assembly may include a crowbar device, shown as crowbar device 106, and a transient voltage suppression device, shown as transient voltage suppression device 108. An example of a suitable unidirectional crowbar device is a unidirectional SIDAC or unidirectional SIDACtor, while an example of a suitable unidirectional TVS device is a Zener diode or avalanche diode. The embodiments are not limited in this context. The crowbar device 106 may include a first crowbar terminal 115 that is connected to a first external voltage line, shown as the first electrical line 102, and a second crowbar terminal 117. The second crowbar terminal 117 of the crowbar device 106 may be connected to a first TVS terminal 119 of the transient voltage suppression device 108. The transient voltage suppression device 108 may further include a second TVS terminal 121 connected to the second external voltage line, shown as second electrical line 104.

In operation, when an overvoltage event occurs, wherein the voltage between the first electrical line 102 and second electrical line 104 exceeds a certain value, the overvoltage protection assembly may be triggered to respond to the overvoltage event in a manner that protects the circuit 110. For example, the crowbar device 106, initially in a standby or OFF state, may develop an excess current in response to a certain voltage value generated during a power surge, as in known crowbar devices. In particular, at a characteristic voltage, or breakover voltage, the current may trigger the crowbar device 106 to rapidly transition to an ON state, where the voltage rapidly drops (folds back) to a lower voltage, causing the external transient voltage between first electrical line 102 and second electrical line 104 to be diverted through the overvoltage protection assembly 100. In conjunction with the transient voltage suppression device 108, the overvoltage event may then be clamped at a clamp voltage determined by the exact characteristics of the transient voltage suppression device 108 and crowbar device 106, until the power surge is dissipate, when the crowbar device 106 may reset to an OFF state.

FIG. 2 presents a circuit representation of one implementation of another overvoltage protection arrangement according to embodiments of the disclosure. In particular, an overvoltage protection assembly 120 is implemented between the first electrical line 102 and second electrical line 104. In this embodiment, the first electrical line 102 and second electrical line 104 may be coupled to AC voltage source, such as a AC power source, thus representing AC power lines in one implementation.

The overvoltage protection assembly 120 may include a first discrete component 136 and a second discrete component 138, where the first discrete component 136 and the second discrete component 138 are electrically connected to one another in electrical series between the first electrical line 102 and the second electrical line 104. In this embodiment, as well as other embodiments, the overvoltage protection assembly may include a bidirectional crowbar device, shown as crowbar device 126, and a bidirectional overvoltage protection device, shown as transient voltage suppression device 128. An example of a suitable bidirectional crowbar device is a SIDAC or SIDACtor, while an example of a suitable TVS device is a pair of TVS diodes having a cathode-to-cathode configuration, as shown in FIG. 2. The overvoltage protection assembly 120 may be configured with terminal configurations as in the overvoltage protection assembly 100.

According to known principles, a bi-directional or symmetrical semiconductor crowbar device may provide an effective AC powerline protection. Under normal operation when AC voltage does not exceed a breakover voltage, such a semiconductor crowbar device does not turn on. When AC peak voltage or a surge transient voltage exceeds the breakover voltage, the semiconductor crowbar device may enter an ON state, as discussed above, placing the semiconductor crowbar device in a low voltage ON state, and triggering the external transient voltage to be diverted.

In the embodiments as shown in FIG. 2, when a bidirectional semiconductor crowbar device is coupled together with a bidirectional TVS device, the resulting overvoltage protection device may form a low clamping voltage bi-directional surge protection device.

FIG. 3 presents a circuit representation of one implementation of another overvoltage protection arrangement according to embodiments of the disclosure. In particular, an overvoltage protection assembly 140 is implemented between a first electrical line 102 and second electrical line 104. The first electrical line 102 and second electrical line 104 may be coupled to DC voltage source, such as a DC power source, thus representing DC power lines in one implementation.

In operation, the overvoltage protection assembly 140 may act to limit voltage coupled to a DC source. In the example of FIG. 3, the overvoltage protection assembly 140 may protect the circuit 110, as discussed above. The overvoltage protection assembly 140 may include a component 146 that includes a unidirectional crowbar device, shown as crowbar device 106, and a unidirectional transient voltage suppression device, shown as transient voltage suppression device 108, discussed above. In this embodiment, different from FIG. 1, the crowbar device 106 and transient voltage suppression device 108 are housed in a common component, where the component 146 may represent a common semiconductor substrate, such as a semiconductor die, or a package that houses different die. Operation of the overvoltage protection assembly 140 may proceed similarly to the operation of overvoltage protection assembly 100, discussed above.

FIG. 4 presents a circuit representation of one implementation of another overvoltage protection arrangement according to embodiments of the disclosure. In particular, an overvoltage protection assembly 160 is implemented between a first electrical line 102 and second electrical line 104. The first electrical line 102 and second electrical line 104 may be coupled to AC voltage source, such as a AC power source, thus representing AC power lines in one implementation.

In operation, the overvoltage protection assembly 160 may act to limit voltage coupled to an AC source. In the example of FIG. 4, the overvoltage protection assembly 160 may protect the circuit 110, as discussed above. The overvoltage protection assembly 160 may include a component 166 that includes a bidirectional crowbar device, shown as crowbar device 126, and a bidirectional transient voltage suppression device, shown as transient voltage suppression device 128, discussed above. In this embodiment, different from FIG. 2, the crowbar device 126 and transient voltage suppression device 128 are housed in a common component, where the component 166 may represent a semiconductor die or a package housing different die. Operation of the overvoltage protection assembly 160 may proceed similarly to the operation of overvoltage protection assembly 120, discussed above.

FIG. 5 presents a circuit representation of one implementation of an overvoltage protection arrangement, according to further embodiments of the disclosure. In this example, in addition to the crowbar device 126 and transient voltage suppression device 128, the overvoltage protection assembly 120 includes a snubber circuit 196, which circuit may include a capacitor and resistor, or other known snubber circuit arrangement. The snubber circuit 196 may provide better reduction on overshoot voltage, and may be effective for very rapid transient voltages, whose duration may span between nanoseconds to several microseconds. The specific capacitance and resistance of snubber circuit 196 may be based upon the inrush/overshoot pulse width to be treated by transient voltage suppression device 128.

Figure 6:
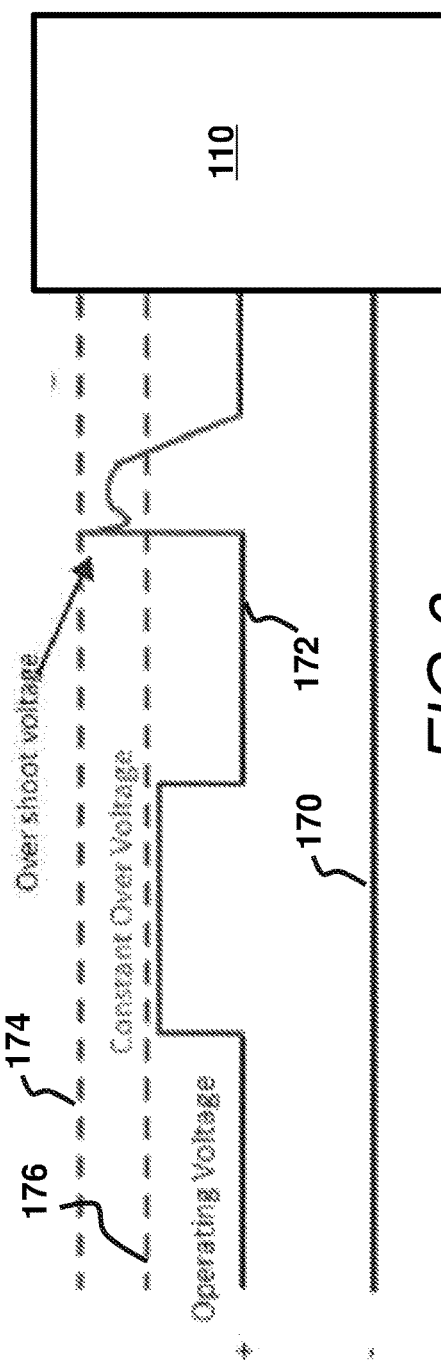
FIG. 6 presents one scenario of operation of an overvoltage protection device according to embodiments of the disclosure.

FIG. 6 presents one scenario of operation of an overvoltage protection device according to embodiments of the disclosure. The voltage difference between a line voltage 170 and a line voltage 172 is shown schematically along the vertical direction in the figure, while time is represented along the horizontal. A constant overvoltage level 174 is shown as well as a maximum voltage 176, which voltage may be a maximum allowed circuit voltage. A voltage surge 178 is shown, where the peak voltage of the voltage surge 178 does not exceed the maximum voltage 176, thus protecting the circuit 110 from damage. At the same time, longer term voltage excursions that are below the constant overvoltage level may be tolerated.

Figure 7:
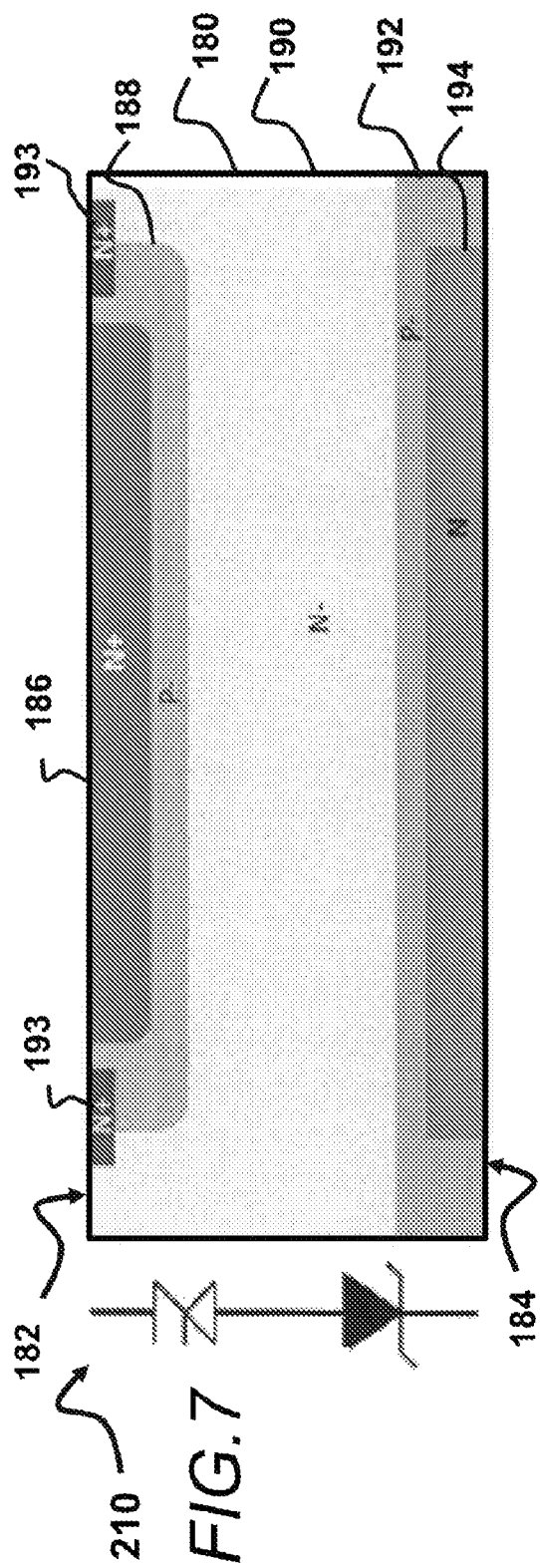
FIG. 7 presents a side cross-sectional view of a hybrid overvoltage protection device according to various embodiments.

FIG. 7 presents a side cross-sectional view of a hybrid overvoltage protection device 210 according to various embodiments. The hybrid overvoltage protection device 210 is embodied in semiconductor substrate 180, such as a monocrystalline silicon wafer or chip. The hybrid overvoltage protection device 210 presents the equivalent of an electrical circuit having a unidirectional crowbar device and a unidirectional TVS device arranged in electrical series with one another, as shown.

With reference to FIG. 1, for example, the semiconductor substrate 180 includes a first surface 182, which surface may form a portion of the first crowbar terminal 115, as well as a second surface 184, opposite the first surface 182, and forming a portion of the second TVS terminal 121. The semiconductor substrate 180 may further include a first N-doped region 186, where the first N-doped region 186 is disposed adjacent to the first surface 182. The semiconductor substrate 180 may also include a first P-doped region 188, where the first P-doped region 188 is disposed adjacent the first N-doped region 186 and surrounds the first N-doped region 186 within the semiconductor substrate 180. The semiconductor substrate 180 may also include a second N-doped region 190, the second N-doped region 190 being disposed adjacent the first P-doped region 188, where the second N-doped region 190 and first N-doped region 186 do not share a common interface. Generally, the second N doped region 190 may be more lightly doped than the first N doped region. The semiconductor substrate 180 may also include a third N-doped region 194, where the third N-doped region 194 is disposed adjacent the second surface 184. The semiconductor substrate 180 may also include a second P-doped region 192, where the second P-doped region 192 is disposed between the second N-doped region 190 and the third N-doped region 194, and surrounds the third N-doped region 194 within the semiconductor substrate 180. Generally, the top four regions, (186,188,190,192) may constitute a crowbar device, while the bottom 2 layers (192, 194) may constitute a TVS device. In some embodiments, the first N-doped region 186 may have a doping concentration of $1.0 \times 10^{18}$ cm$^{-3}$ to $1.0 \times 10^{21}$ cm$^{-3}$, the first P-doped region 188 may have a doping concentration of $1.0 \times 10^{16}$ cm$^{-3}$ to $3.0 \times 10^{18}$ cm$^{-3}$, the second N-doped region 190 may have a doping concentration of $1 \times 10^{13}$ cm$^{-3}$ to $1.0 \times 10^{17}$ cm$^{-3}$, the second P-doped region 192 may have a doping concentration of $1 \times 10^{15}$ cm$^{-3}$ to $1 \times 10^{8}$ cm$^{-3}$, and the third N-doped region 194 may have a doping concentration of $1 \times 10^{18}$ cm$^{-3}$ to $1.0 \times 10^{21}$ cm$^{-3}$. In one embodiment, the first N-doped region 186 may have a doping concentration of $1.0 \times 10^{20}$ cm$^{-3}$, the first P-doped region 188 may have a doping concentration of $1.0\times10^{18}$ cm$^{-3}$, the second N-doped region 190 may have a doping concentration of $1.0\times10^{14}$ cm$^{-3}$, the second P-doped region 192 may have a doping concentration of $4.5\times10^{16}$ cm$^{-3}$, and the third N-doped region 194 may have a doping concentration of $1.0\times10^{20}$ cm$^{-3}$.

The hybrid overvoltage protection device 210 may also include an N$^+$ doped surface region 193, disposed adjacent the first surface 182, and overlapping the second N-doped region 190 and first P-doped region 188, where the first N$^+$ doped surface region 193 is disposed outside of the first N-doped region 186. The first N+ doped surface region 193 may have a doping concentration in the range of $1\times10^{18}$ cm$^{-3}$ to $1.0\times10^{21}$ cm$^{-3}$ and in particular $1.0\times10^{20}$ cm$^{-3}$.

Figure 8:
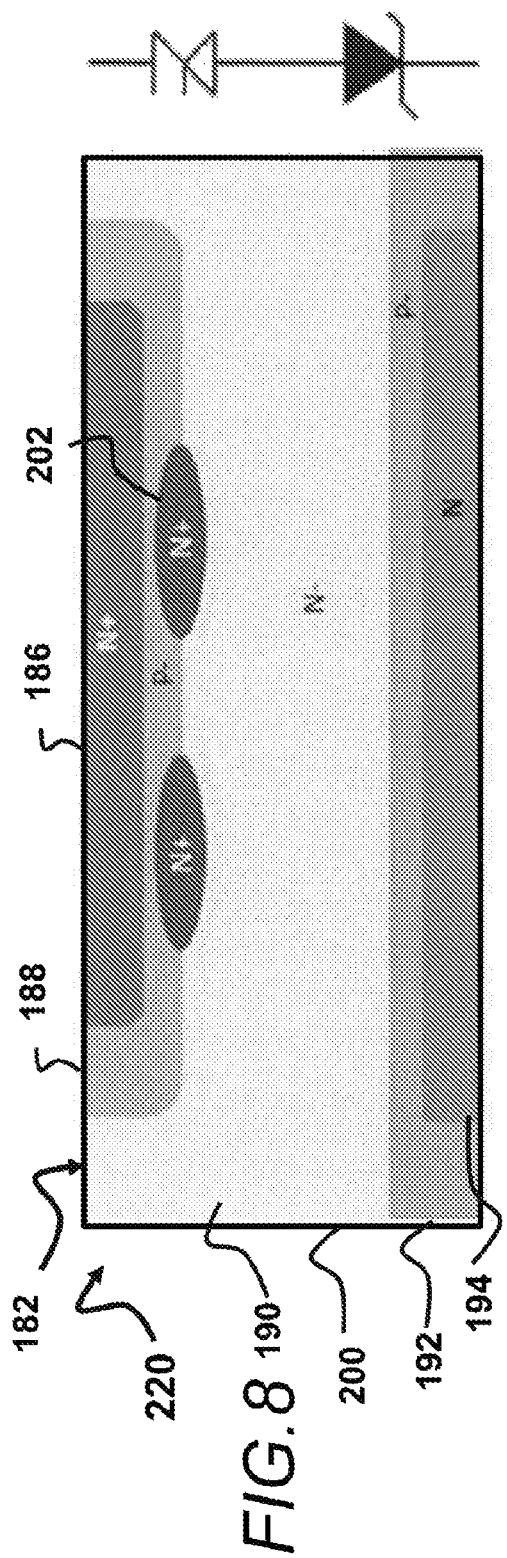
FIG. 8 presents a side cross-sectional view of another hybrid overvoltage protection device according to various embodiments.

FIG. 8 presents a side cross-sectional view of another hybrid overvoltage protection device according to various embodiments. The hybrid overvoltage protection device 220 is embodied in semiconductor substrate 180, such as a monocrystalline silicon wafer. The hybrid overvoltage protection device 220 presents the equivalent of an electrical circuit having a unidirectional crowbar device and a unidirectional TVS device arranged in electrical series with one another, as shown. A difference in the hybrid overvoltage protection device 220 as compared to hybrid overvoltage protection device 210 is the provision of N$^+$ doped buried regions 202 disposed between the first P-doped region 188 and the second N-doped region 190, and under the first N-doped region 186.

Notably, in the configurations of FIG. 7 and FIG. 8, while the semiconductor substrate 180 or semiconductor substrate 200 incorporate a TVS device and crowbar device in electrical series, there is no separate second crowbar terminal and first TVS terminal. Rather, the two devices are integrated seamlessly where the two devices share a common doped layer (192).

Figure 9:
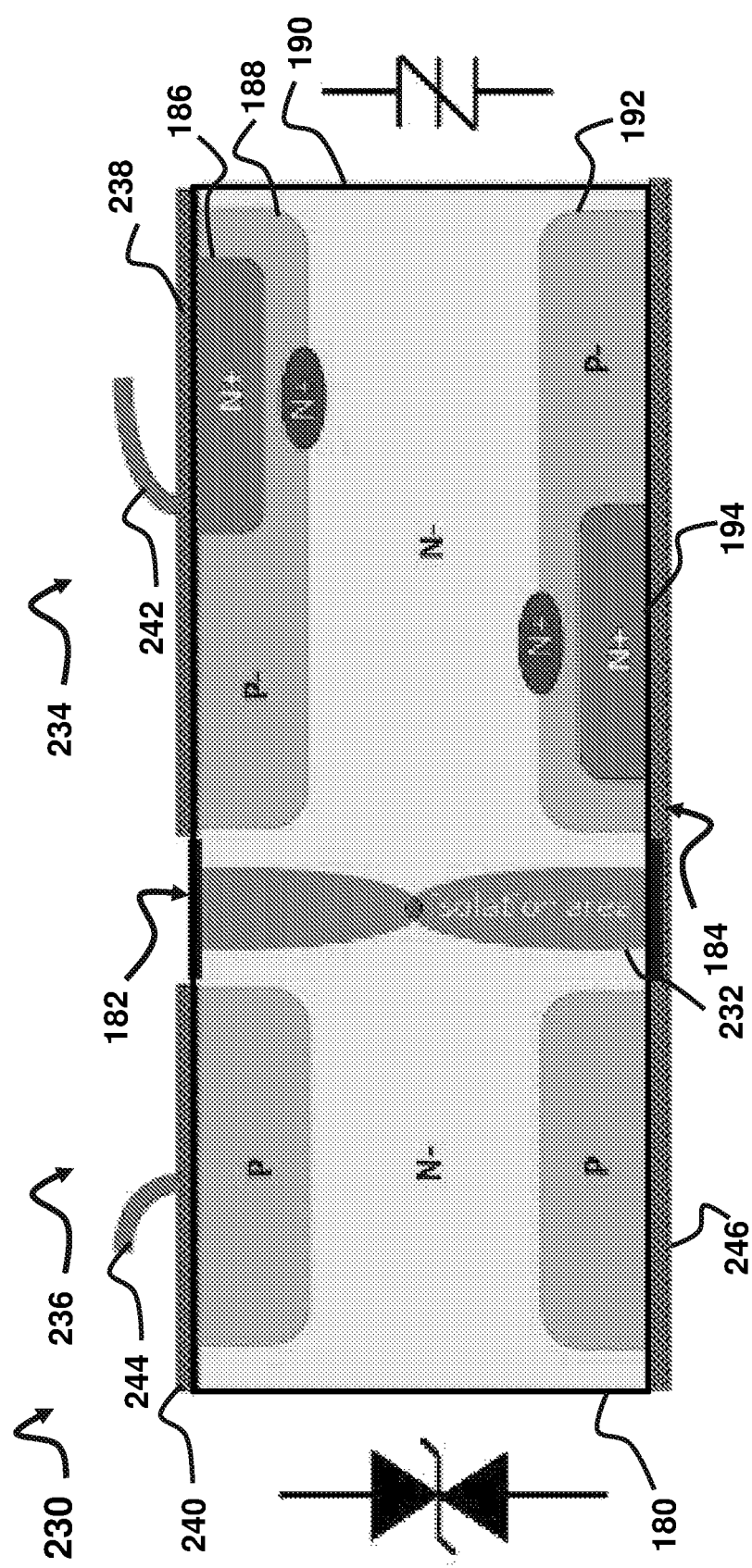
FIG. 9 presents a side cross-sectional view of another hybrid overvoltage protection device according to various embodiments.

FIG. 9 presents a side cross-sectional view of another hybrid overvoltage protection device according to various embodiments. In this embodiment, a hybrid overvoltage protection device, shown as overvoltage protection device 230, is arranged differently than in the embodiments of FIG. 7 and FIG. 8, where the overvoltage protection device 230 provides bidirectional TVS device and a bi-directional crowbar device. In the configuration of FIG. 9, the overvoltage protection device 230 is arranged where a crowbar device 234 is located in a first region, and a TVS device 236 is located in a second region, laterally displaced from the first region. The crowbar device 234 extends from the first surface 182 to the second surface 184, while the TVS device 236 also extends from the first surface 182 to the second surface 184. The overvoltage protection device 230 further includes an electric isolation region 232, disposed between the crowbar device 234 and the TVS device 236, where the electric isolation region 232 also extends between the first surface 182 and the second surface 184. The electric isolation region 232 may be formed using an insulating material such as an oxide, or may be formed using dopant isolation, according to known techniques. The overvoltage protection device 230 further includes a crowbar device contact 238, serving as a first crowbar terminal, and a TVS device contact 240, serving as a second TVS terminal, each disposed on the first surface 182. The crowbar device contact 238 and TVS device contact 240 form electrical contact to external contact 242 and external contact 244, respectively. The overvoltage protection device 230 further includes a bottom contact 246 that serves as a second crowbar terminal and as a first TVS terminal, and accordingly joins the crowbar device 234 and TVS device 236 in electrical series. In this manner the first crowbar terminal and the second TVS terminal of the overvoltage protection device 230 are disposed on the first surface 182 while the second crowbar terminal and first TVS terminal are disposed on the second surface 184.

As shown in FIG. 9, the crowbar device may include a top N doped region 187, arranged adjacent the first surface 182, a middle N-doped region 191, and bottom N doped region 195, arranged adjacent the second surface 184, where the bottom N doped region 195 and top N doped region 187 are both heavily doped, that is, are N$^+$ regions. In some embodiments, the top N doped region 187 and the bottom N doped region 195 may have a doping concentration in the range of $1\times10^{18}$ cm$^{-3}$ to $1.0\times10^{21}$ cm$^{-3}$ and in particular $1.0\times10^{20}$ cm$^{-3}$, the first P doped region 188 and the second P-doped region 192 may have a doping concentration of $1\times10^{16}$ cm$^{-3}$ to $5.0\times10^{18}$ cm$^{-3}$ and in particular $2.0\times10^{18}$ cm$^{-3}$, the N$^+$ doped buried regions 202 may have a doping concentration of $1\times10^{15}$ cm$^{-3}$ to $3.0\times10^{18}$ cm$^{-3}$ and in particular $1.0\times10^{18}$ cm$^{-3}$.

As further shown in FIG. 9, the TVS device 236 may include a top P doped region 241, arranged adjacent the first surface 182, a bottom P doped region 243, arranged adjacent the second surface 184, and an intermediate N doped region 245, disposed between the top P doped region 241 and the bottom P doped region 243. The intermediate N doped region 245 may have the same doping level as the second N-doped region 190, and may be doped in the same process as used to form second N doped region 190. The three-layer structure of the TVS device 236 accordingly forms a pair of TVS diodes having a cathode-to-cathode configuration, as shown. The top P doped region 241 and the bottom P doped region 243 may have a doping concentration of $1\times10^{18}$ cm$^{-3}$ to $1\times10^{20}$ cm$^{-3}$ and in particular $5.0\times10^{19}$ cm$^{-3}$, the intermediate N doped region 245 may have a doping concentration of $1\times10^{13}$ cm$^{-3}$ to $2.0\times10^{17}$ cm$^{-3}$ and in particular $7.7\times10^{16}$ cm$^{-3}$.

Figure 10:
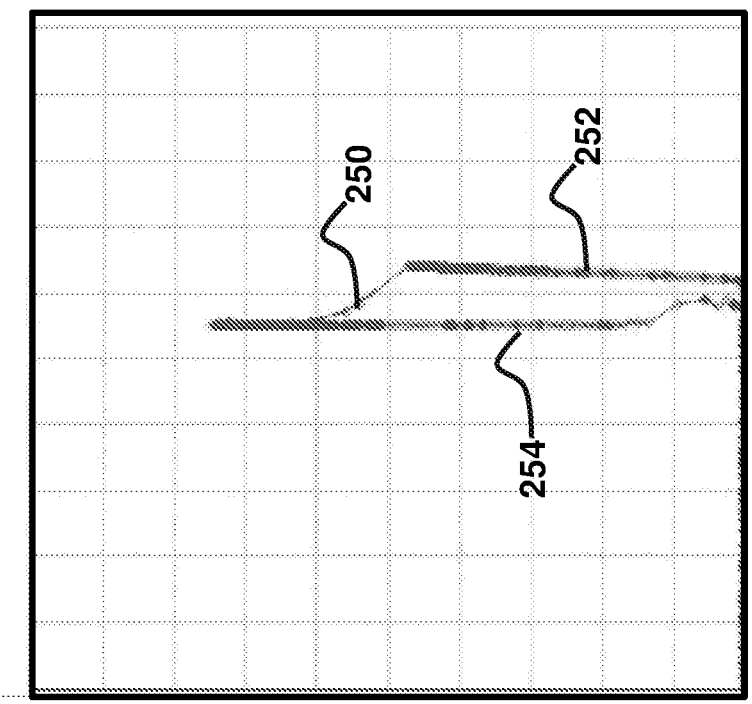
FIG. 10 presents an exemplary current-voltage curve for an overvoltage protection device according to embodiments of the disclosure.

Turning now to FIG. 10, there is shown an exemplary current-voltage curve for an overvoltage protection device according to embodiments of the disclosure. In this example, a hybrid overvoltage protection device is arranged with a crowbar device and TVS in electrical series between two external voltage lines. The curve 250 shows a first portion 252, representing the breakover voltage of approximately 63 V, and a second portion 254 representing a clamp voltage where the voltage has folded back to approximately 55 V.

Figure 11:
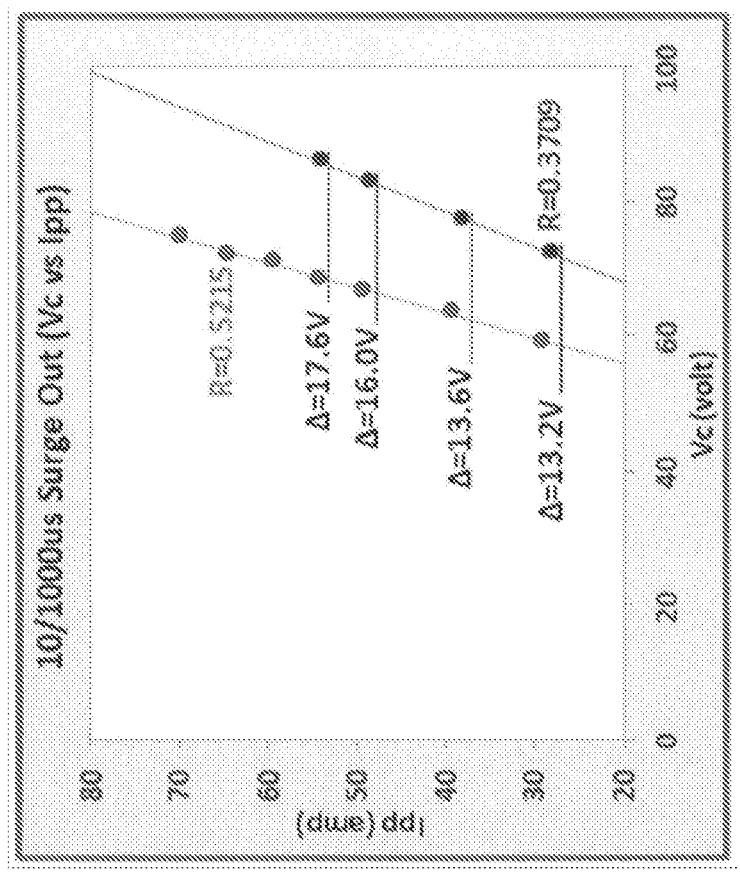
FIG. 11 presents a comparison of current-voltage plots for a known device and an overvoltage protection device arranged according to embodiments of the disclosure.

FIG. 11 presents a comparison of current-voltage plots for a known TVS device (right line) and a hybrid overvoltage protection device (left line) arranged according to embodiments of the disclosure. The clamp voltage Vc is shown as a function of current Ipp of a pulse. As illustrated, the hybrid overvoltage protection device, including a TVS device and crowbar device, provides a much lower clamp voltage for a given Ipp and the maximum pulse diverted is 70.4 A for the hybrid overvoltage protection device, as compared to 54.4 A for a known TVS device.

The aforementioned embodiments provide a flexible approach to overvoltage protection that can be tailored to different applications. For example, in a 12 V automotive system may be required to withstand a 31V constant overvoltage. For a 122V 188 millisecond 2.5 ohm load dump transient, the transient clamp voltage may be less than 40 V. A hybrid device composed of a TVS and crowbar device may be tailored for this application by incorporating a 28 V TVS device where Vc (clamping voltage) is less than 40 V. An 8V rapid switching crowbar device may also be incorporated in the hybrid device so that the 28V TVS device and 8V crowbar device in series provide a higher breakover voltage than 31 V and is less than 40 V.

While the present embodiments have been disclosed with reference to certain embodiments, numerous modifications, alterations and changes to the described embodiments are possible without departing from the sphere and scope of the present disclosure, as defined in the appended claims. Accordingly, the present embodiments may not be limited to the described embodiments, but have the full scope defined by the language of the following claims, and equivalents thereof.

What is claimed is:

1. An overvoltage protection device, comprising:
    a crowbar device, the crowbar device including:
        a first crowbar terminal, the first crowbar terminal for connection to a first external voltage line; and
    a transient voltage suppression (TVS) device, the TVS device having:
        a second TVS terminal, the second TVS terminal for connection to a second external voltage line, wherein the crowbar device and the TVS device are arranged in electrical series between the first crowbar terminal and the second TVS terminal;
    wherein the TVS device and the crowbar device are disposed within a common semiconductor substrate, the common semiconductor substrate comprising:
        a first surface, the first surface forming a first portion of the first crowbar terminal; and
        a second surface, opposite the first surface, the second surface forming a second portion of the second TVS terminal.

2. The overvoltage protection device of claim 1, wherein the TVS device comprises a Zener diode, an avalanche diode, or TVS diode.

3. The overvoltage protection device of claim 1, wherein the TVS device comprises a pair of TVS diodes having a cathode-to-cathode configuration.

4. The overvoltage protection device of claim 1, the common semiconductor substrate comprising:
    a first N-doped region, the first N-doped region being disposed adjacent to the first surface; a first P-doped region, the first P-doped region being disposed adjacent the first N-doped region and surrounding the first N doped region within the common semiconductor substrate;
    a second N-doped region, the second N-doped region being disposed adjacent the first P-doped region, wherein the second N-doped region and first N-doped region do not share a common interface;
    a third N-doped region, the third N-doped region being disposed adjacent the second surface; and a second P-doped region, the second P-doped region being disposed between the second N-doped region and the third N-doped region, and surrounding the third N-doped region within the common semiconductor substrate.

5. The overvoltage protection device of claim 4, further comprising:
    an N+doped surface region disposed adjacent the first surface and overlapping the second N-doped region and first P-doped region, the N+doped surface region being disposed outside of the first N-doped region.

6. The overvoltage protection device of claim 4, further comprising:
    at least one N+doped buried region, the at least one N+doped buried region being disposed between the first P-doped region and the second N-doped region, and under the first N-doped region.

7. An overvoltage protection assembly, comprising:
    a first semiconductor chip, the first semiconductor chip comprising a crowbar device; and
    a second semiconductor chip, the second semiconductor chip comprising a TVS device and being electrically connected to the first semiconductor chip;
    wherein the overvoltage protection assembly comprises a first external terminal forming contact with the crowbar device, the first external terminal for connection to a first external voltage line, and wherein the overvoltage protection assembly comprises a second external terminal forming contact with the TVS device, the second external terminal for connection to a second external voltage line, wherein the crowbar device and the TVS device are arranged in electrical series between the first external terminal and the second external terminal;
    wherein the TVS device and the crowbar device are disposed within a common semiconductor substrate, the common semiconductor substrate comprising:
        a first surface, the first surface forming a first portion of the first crowbar terminal; and
        a second surface, opposite the first surface, the second surface forming a second portion of the second TVS terminal.

8. The overvoltage protection assembly of claim 7, wherein the TVS device comprises a Zener diode, an avalanche diode, or TVS diode.

* * * * *